US010829351B2

(12) United States Patent
Wild et al.

(10) Patent No.: US 10,829,351 B2
(45) Date of Patent: Nov. 10, 2020

(54) EXCAVATOR BATTERY MOUNTING (71) Applicant: J. C. Bamford Excavators Limited, Uttoxeter (GB)

(72) Inventors: Richard Paul Wild, Uttoxeter (GB); Rod Scott, Uttoxeter (GB); Sam Wilkinson, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 0 days.

(21) Appl. No.: 16/367,117

(22) Filed: Mar. 27, 2019

(65) Prior Publication Data
US 2019/0300348 A1   Oct. 3, 2019

(30) Foreign Application Priority Data

Mar. 27, 2018  (GB) .................................. 1804890.0

(51) Int. Cl.
| *B60K 1/04* | (2019.01) |
| *B66F 9/075* | (2006.01) |
| *B60L 50/60* | (2019.01) |
| *B66F 9/065* | (2006.01) |

(52) U.S. Cl.
CPC ............ *B66F 9/07531* (2013.01); *B60K 1/04* (2013.01); *B60L 50/66* (2019.02); *B66F 9/0655* (2013.01); *B66F 9/0754* (2013.01); *B60K 2001/0416* (2013.01); *B60L 2200/40* (2013.01); *B60Y 2200/15* (2013.01); *B60Y 2400/112* (2013.01)

(58) Field of Classification Search
CPC ....................................................... B60K 1/04
See application file for complete search history.

(56) References Cited

U.S. PATENT DOCUMENTS

| 3,047,172 | A |  | 7/1962 | Ulinski |  |
| 5,813,821 | A |  | 9/1998 | Braud |  |
| 2013/0078071 | A1 | * | 3/2013 | Noguchi | ........... B60K 1/04 414/719 |

(Continued)

FOREIGN PATENT DOCUMENTS

| CN | 104500113 B | 8/2016 |
| CN | 107337155 A | 11/2017 |

(Continued)

OTHER PUBLICATIONS

Search Report for GB Application No. 1804890.0, dated Aug. 26, 2018.

(Continued)

*Primary Examiner* — James A Shriver, II
*Assistant Examiner* — James J Triggs
(74) *Attorney, Agent, or Firm* — Marshall, Gerstein & Borun LLP (57) ABSTRACT

A load-handling vehicle, including a body; a boom, pivotally mounted to the body at a rear end region so that the boom can pivot up and down about an axis extending laterally with respect to the vehicle, wherein the boom has a load carrying implement attachable at a forward end region thereof; a steerable ground engageable propulsion arrangement; an electrically powered drive for the propulsion arrangement; a platform positioned at the rear of the body and to the side of the boom; and a battery pack positioned on the platform.

21 Claims, 12 Drawing Sheets

(56) References Cited

U.S. PATENT DOCUMENTS

| | | | |
|---|---|---|---|
| 2016/0001748 A1* | 1/2016 | Moskowitz | B60K 1/04 |
| | | | 701/22 |
| 2016/0144799 A1* | 5/2016 | Shipman | E02F 3/386 |
| | | | 248/647 |
| 2017/0362796 A1 | 12/2017 | Nakagawa et al. | |

FOREIGN PATENT DOCUMENTS

| | | |
|---|---|---|
| EP | 0569277 A1 | 11/1993 |
| FR | 3 018 797 A1 | 9/2015 |

OTHER PUBLICATIONS

Extended European Search Report for European Patent Application No. 19165048.0, dated Sep. 4, 2019.

\* cited by examiner

EXCAVATOR BATTERY MOUNTING

FIELD

The present teachings relate to a load-handling vehicle. In particular, but not exclusively, the present teachings relate to a compact electric load-handling vehicle suitable for use in warehouses or similar situations where the vehicle is likely to experience restricted maneuvering space.

BACKGROUND

Due to an increasing demand to reduce carbon emissions and exhaust emissions generally, it is known for conventional mast-type forklift trucks to be electrically powered. As well as reducing carbon emissions and exhaust emissions, there may be other advantages of electrifying such load-handling vehicles; such as, reduced running costs, increased vehicle lifetime, operator health benefits, etc. However, it is known for lead-acid battery cells to be large in volume compared to equivalent power output diesel or CNG engines. Consequently, it is a problem that the overall dimensions of the vehicle to be electrified will inherently increase.

This is a particular problem for load-handling vehicles which are designed for use in warehouses, industrial sites and the like where narrow aisles or spaces and tight corners are commonly encountered. Therefore, it is desirable for such vehicles to have good maneuverability, and for their overall dimensions to be kept to a minimum. Additionally, any load-handling vehicle operated in warehouse environments will naturally increase the threat of collisions and accidents. To reduce the likelihood of such collisions and accidents occurring, it is desirable for the vehicle to be configured in such a way that the driver is provided with a high level of visibility in all directions. Such a requirement places further dimensional constraints on electrically powered load-handling vehicles.

Electric load-handling vehicles are typically equipped with a battery capable of powering the vehicle for a standard eight-hour shift, which is suitable for vehicles used in warehouses that operate during only these hours. When this is the case, it is possible for the battery pack to be charged in situ, and there is no necessary requirement for the battery pack to be removed from the vehicle. However, many warehouses operate more than 8 hours, and therefore require load-handling vehicles capable of being operated with minimal interruption for longer periods of time. Commonly, this is achieved by physically removing the depleted battery pack from the load-handling vehicle and replacing it with a charged battery pack. The depleted pack can therefore be charged away from the vehicle whilst the vehicle operates with the second battery pack.

The present applicant produces a load-handling vehicle with a telescopic boom offset from the vehicle's centerline with a lifting carriage attached thereto, the configuration of which is generally shown in patent GB 2 327 077. Such a load-handling vehicle advantageously offers further forward reach compared to a mast-type forklift vehicle, as well as vertical lift, improved forward visibility and the ability to tilt the implement carriage through a greater angular range.

However, a problem with such a load-handling vehicle is that it is more challenging to accommodate a battery pack. This is due to such load-handling vehicles comprising a more complex configuration of parts. For example, due to the boom's offset position from the vehicle's centerline and its rearward mounting, the vehicle's chassis must be structurally adapted to react the forces produced by loading of the lifting carriage. Accordingly, the vehicle's chassis requires additional structural members not present in conventional mast-type forklift trucks.

It is therefore an object of the present teachings to overcome one or more problems associated with the prior art.

SUMMARY

The present teachings relate to a load-handling vehicle comprising a body and a boom pivotally mounted to the body at a rear end region, so that the boom can pivot up and down about an axis extending laterally with respect to the vehicle. Additionally, the boom has a load carrying implement attachable at a forward end region thereof. The load-handling vehicle further comprises a steerable ground engageable propulsion arrangement, an electrically powered drive for the propulsion arrangement, a platform positioned at the rear of the body and to the side of the boom and a battery pack positioned on the platform.

Advantageously, this arrangement permits a load-handling machine of this type to have electrically powered propulsion and further enables the battery pack to be utilized as a counterweight to loads lifted on the boom.

The battery pack of the load-handling vehicle may have an irregular shape in plan view.

Advantageously, this may prevent the battery pack being loaded in an incorrect orientation.

The battery pack of the load-handling vehicle may comprise a lateral projection configured to locate rearwardly of the boom.

Advantageously, this maximizes the usage of available space in the vehicle to meet the required energy demands of the vehicle, whilst maintaining the compact dimensions of the vehicle and good visibility.

The ratio of width of the boom to a width of a main part of the battery pack not including the lateral projection is around 1:2 to 1:2.5, optionally 1:2.2 to 1:2.3.

The battery pack of the load-handling vehicle may comprise a recess in plan view at a rear corner thereof on an opposite side of the vehicle to the boom.

Advantageously, this may minimize the degree of tail swing of the vehicle when cornering and allow for improved rear visibility.

The battery pack of the load-handling vehicle may comprise a plurality of standard sized cells arranged to achieve the non-regular shape.

Advantageously, this minimizes the cost by utilizing standard components.

The battery pack of the load-handling vehicle may comprise a container arranged so as to support and protect cells of the battery.

The platform of the load-handling vehicle may be configured to permit the removal of the battery pack in a rearward direction and loading in a forward direction.

Advantageously, this provides a convenient way of loading a vehicle of the present teachings.

A battery access door of the load-handling vehicle may be located rearward of the battery pack and may be operable so as to permit access thereto.

The battery access door of the load-handling vehicle may be structurally reinforced, e.g. by being formed from heavy gauge metal and/or provided with reinforcing ribs and/or being formed at least in part from a metal casting, e.g. of ductile iron.

Advantageously, this protects the battery pack from damage, and may also act as an effective counterweight.

The load-handling vehicle may further comprise a sensor associated with the battery access door contained to sense if the door is open or closed.

Advantageously, this helps to ensure that the vehicle is safe to operate after a battery charge.

The load-handling vehicle may further comprise an interlock to prevent operation of the vehicle if the battery access door is not closed.

Advantageously, this ensures the vehicle cannot be operated if the access door is not closed, which would otherwise compromise safety.

The battery access door of the load-handling vehicle may be hingedly mounted to a structural part of the body of the vehicle.

Advantageously, this further enhances the structural integrity of the rear of the vehicle.

The battery access door of the load-handling vehicle may be mounted to a chassis portion of the body that pivotably mounts the boom.

Advantageously, this is a convenient hard point of the vehicle at the rear thereof.

The ground engageable propulsion arrangement may comprise a pair of wheels arranged towards the front of the vehicle and a pair of wheels arranged towards the rear of the vehicle.

The rear wheels of ground engageable propulsion arrangement may be steered.

The load-handling vehicle may further comprise an operator compartment arranged generally forward of the battery pack, wherein a portion of the operator compartment may be arranged above the battery pack.

The load-handling vehicle may have a space provided within the volume intermediate to the front and rear wheels and offset to the side of the boom to accommodate functional components of the vehicle. The operator compartment may be located above this space.

Advantageously, this space is well protected from unwanted damage by the surrounding vehicle body.

The operator compartment of the load-handling vehicle may be moveable with respect to the body.

Advantageously, this permits access to the space for servicing, etc.

The load-handling vehicle may further comprise a control system, and the control systems may be located in the space intermediate to the front and rear wheels and offset to the side of the boom.

Advantageously, this protects the control system from damage in use.

The load-handling vehicle may further comprise a structural member of the body, and the control system may be mounted to the structural member.

Advantageously, this arrangement allows the structural member to act as a heat sink for the control system electronics.

The load-handling vehicle may further comprise a heat sink which may be mounted intermediate to the control system and the structural member.

Advantageously, this arrangement may enhance the transfer of heat away from the control system electronics.

The control system of the load-handling vehicle may be a battery management system; a propulsion control system; a hydraulic motor control system, a vehicle ECU or a controller for operation of the boom.

The load-handling vehicle may further comprise an electric motor drivingly connected to a hydraulic pump arranged to supply hydraulic fluid to actuate movement of the boom. The electric motor and hydraulic pump may be located within the space intermediate to the front and rear wheels and offset to the side of the boom.

A further aspect of the present teachings provides a battery pack of a load-handling vehicle, the battery pack being of an irregular shape.

Optionally, the battery pack may incorporate features of the battery pack referred to in relation to the first aspect of the present teachings.

BRIEF DESCRIPTION OF DRAWINGS

An embodiment will now be described, by way of example only with reference to the accompanying drawings, wherein.

DETAILED DESCRIPTION

Referring to FIGS. 1 to 4 of the drawings, a load handling vehicle of the telescopic lift truck type is indicated generally at 10. The vehicle 10 has a front end 11 and a rear end 12. Disposed on the front end region are a pair of a front ground engageable wheels 13 which are spaced apart width wise of the vehicle so as to be disposed one at each side 14, 15 on the vehicle. On the rear end region of the vehicle are provided a pair of rear ground engageable wheels 16, again disposed width wise of the vehicle so that the wheels are disposed one at each side, 14, 15 of the vehicle. In this embodiment the vehicle has a wheelbase of 1.8 m but in other embodiments vehicles of this type may have a wheelbase in a range of 1.5-2.0 m. In addition, the overall length of the vehicle is 2911 mm, but typically this could be expected to be in a range of 2 m to 3.5 m.

An operator seat 17 is disposed in an operator's compartment 18 in which is disposed a steering wheel 19 and the conventional foot and hand controls of the vehicle.

The operator's compartment 18 is provided with a top 18a having a plurality of openings 18b which may be glazed as desired. Of course the pattern of openings and whether or not they are glazed can be modified as necessary. The operator's compartment 18 is provided so as to be of adequate strength to satisfy the necessary safety requirements in a conventional manner.

With reference to FIGS. 9 to 12, disposed beneath the operator's seat 17 is a space 19 accommodating an electric motor 20 connected to a pump 21 which provides fluid via suitable conduits to hydraulic actuators arranged to move the working arm as discussed in more detail below. First and second electric drive motors 22a and 22b (FIG. 12) directly drivingly connect to the front wheels 13 which are mounted on the vehicle in conventional manner and which are not steerable.

The rear wheels 16 are mounted by conventional steered axle 16a and are undriven but are steerable by means of steering actuator (not visible).

Figure 12:
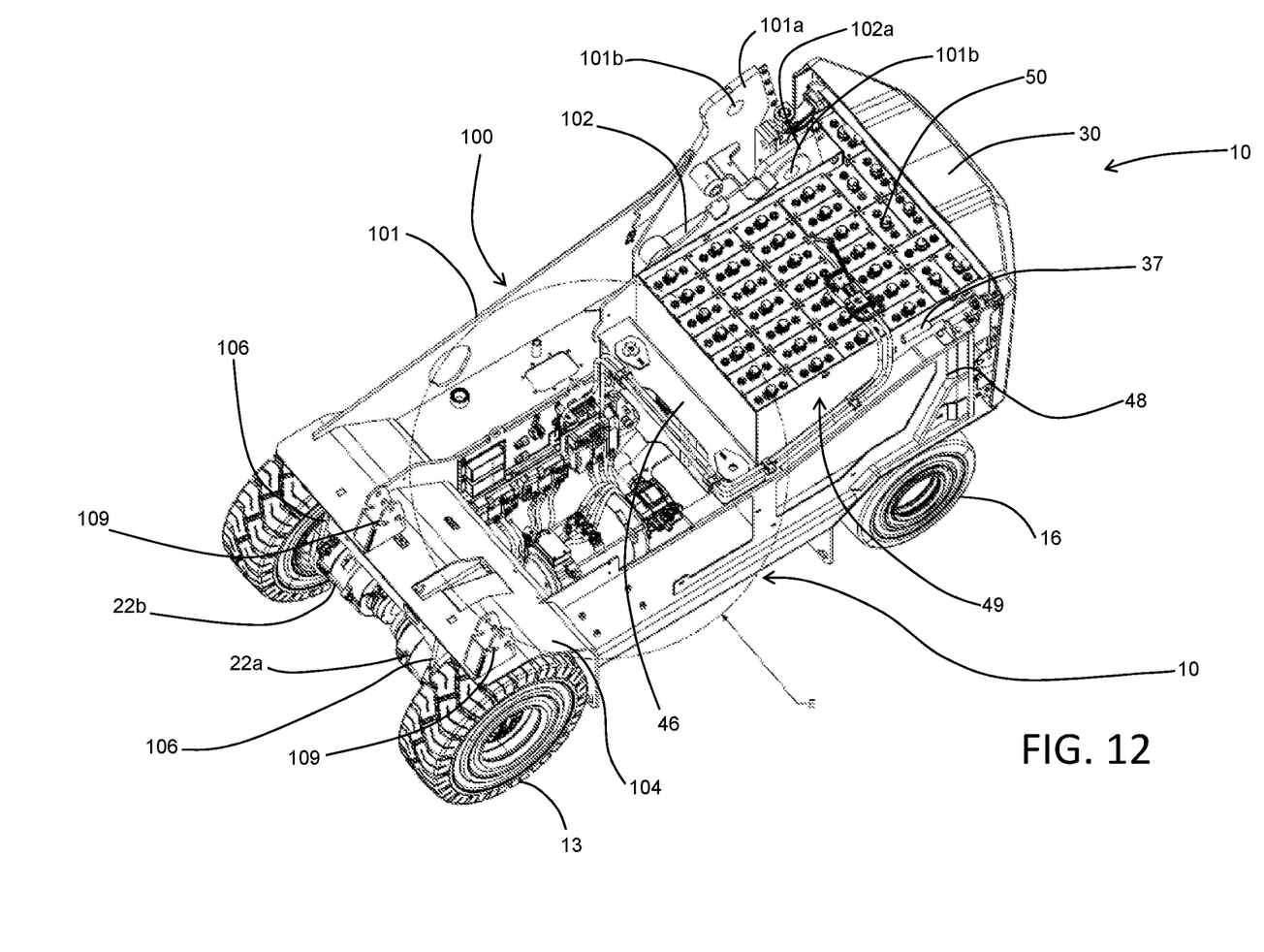
FIG. 12 is an isometric view of the vehicle of FIG. 1 with the cab, bonnet and working arm removed.
Figure 13:
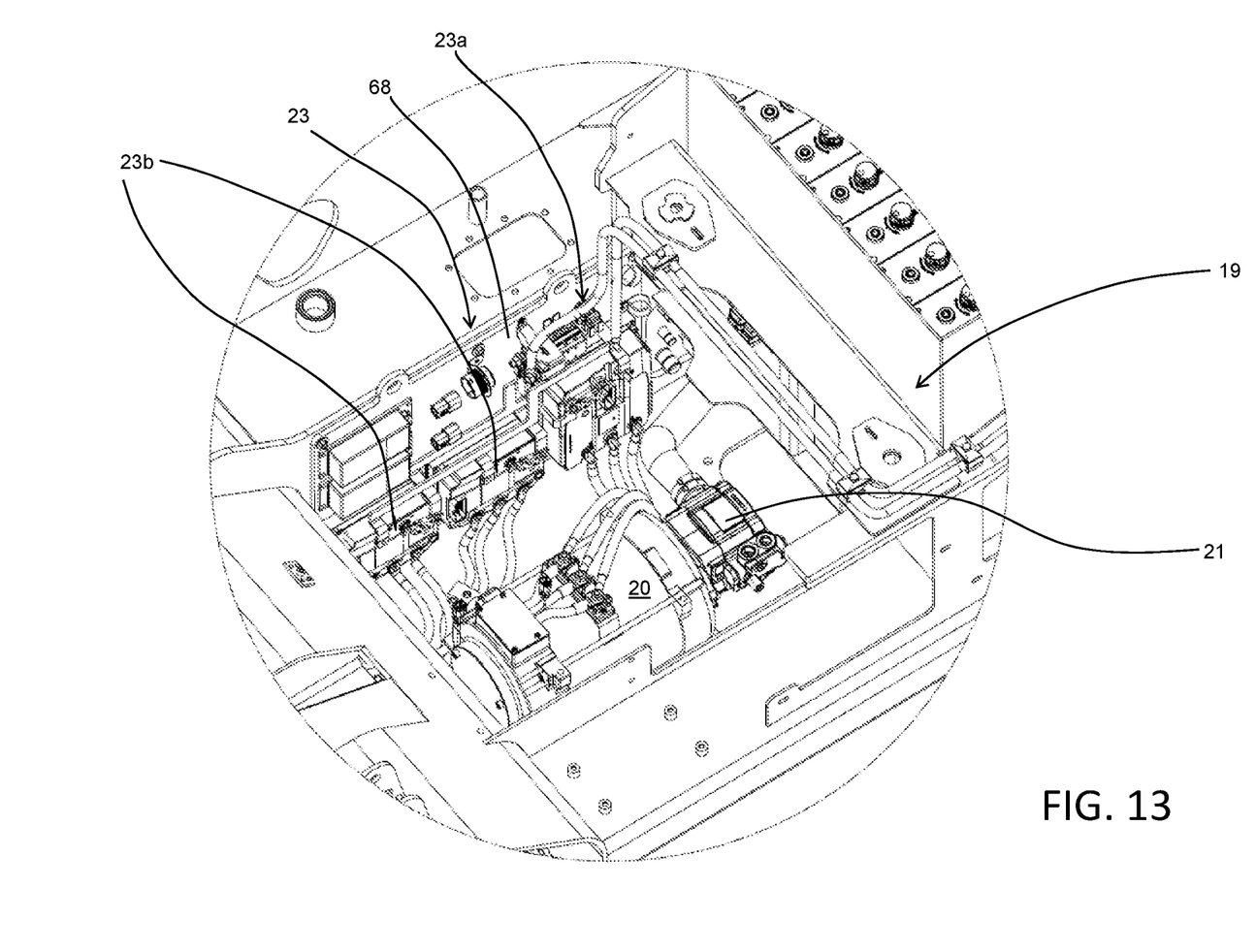
FIG. 13 is detail E of FIG. 12.

The front and rear wheels together with the motors 22a and 22b which drive the front wheels only comprise a ground engageable propulsion arrangement of the vehicle.

The vehicle is provided with a single telescopic boom 25 which extends in a forward direction of the truck parallel to, and off-set width-wise from, a central plane X-X of the vehicle. The boom 25 is mounted on the structure for up and down swinging movement by a pivot point 26 disposed in a rear end region 27 of the boom and also disposed in a rear end region 28 of the vehicle. The overall boom length when retracted is approximately 83% of the total machine length, but in other embodiments may be between 75% and 100%.

The boom 25 is offset from the central plane X-X so as generally to overlie the front and rear wheels 13, 16 at one side 14 of the vehicle and to provide a space for the operator's compartment 18 between the boom 25 and the opposite side 15 of the vehicle.

The boom 25 comprises a rearward portion 29a and a forward portion 29b telescopically received within the rearward portion 29a in conventional manner. An extension ram (not visible) is provided between the boom parts 29a and 29b within the boom part 29b.

The forward boom part 29a is provided with a width wise extending portion 31 which extends from the boom part 29a towards the opposite side 15 of the vehicle and which carries an implement carriage 32. The implement carriage 32 may be provided with any desired load handling implement such as a pair of forks or a platform or any other desired load handling implement.

The implement carriage 32 is connected to the transversely extending part 31 by a pair of pivot points 33 for pivotable crowd movement about a generally horizontal axis. The pivot points 33 are each carried on a limb 34 which extends downwardly from the transversely extending member 31.

The implement carriage 32 is connected to the limbs 34 for pivotal movement under the control of a crowd actuator comprising a pair of crowd rams 35.

The boom 25 is caused to swing up and down by a lift ram 40 connected in a known manner.

The operator compartment 18 may be arranged to pivot forwardly relative to the remainder of the structure about an axis provided by a pivot 38 so that the operator compartment may be tilted upwardly and forwardly along with the seat, steering column and controls in conventional manner to provide access to the electric motor 20, pump 21, and other components within the space 19.

The operator compartment 18 may be glazed on one or more sides. If glazed on all sides it is provided with an access door, not shown.

Figure 10:
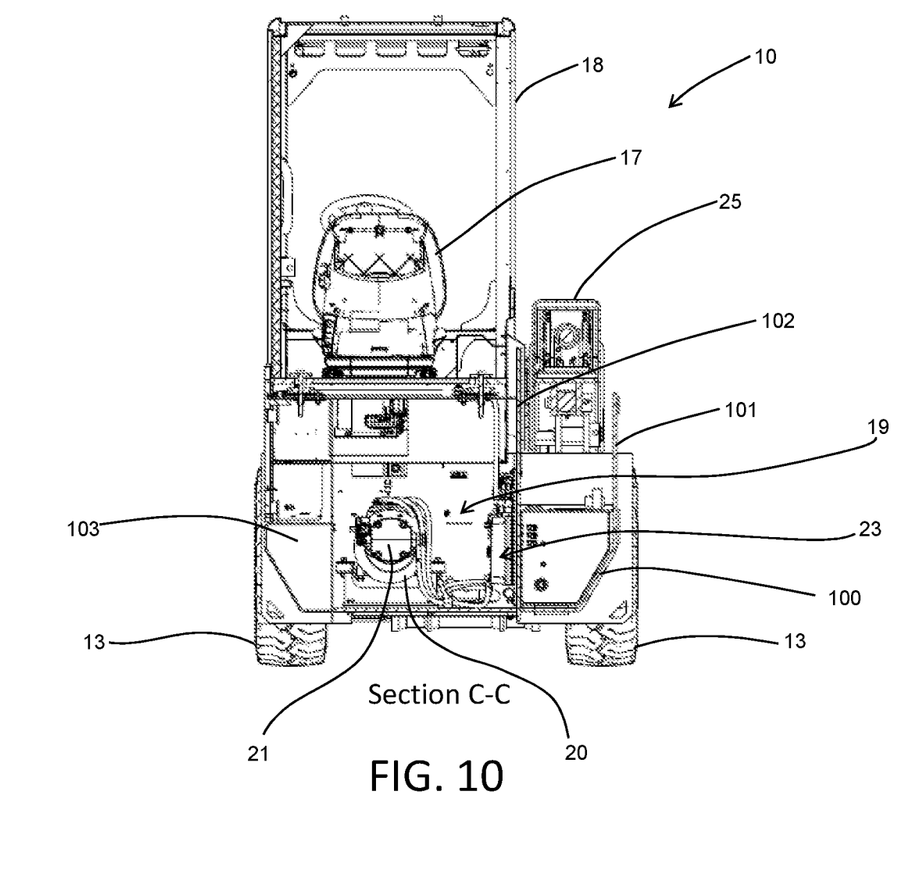
FIG. 10 is a cross-sectional view of the vehicle of FIG. 1 on the plane C-C of FIG. 9.
Figure 11:
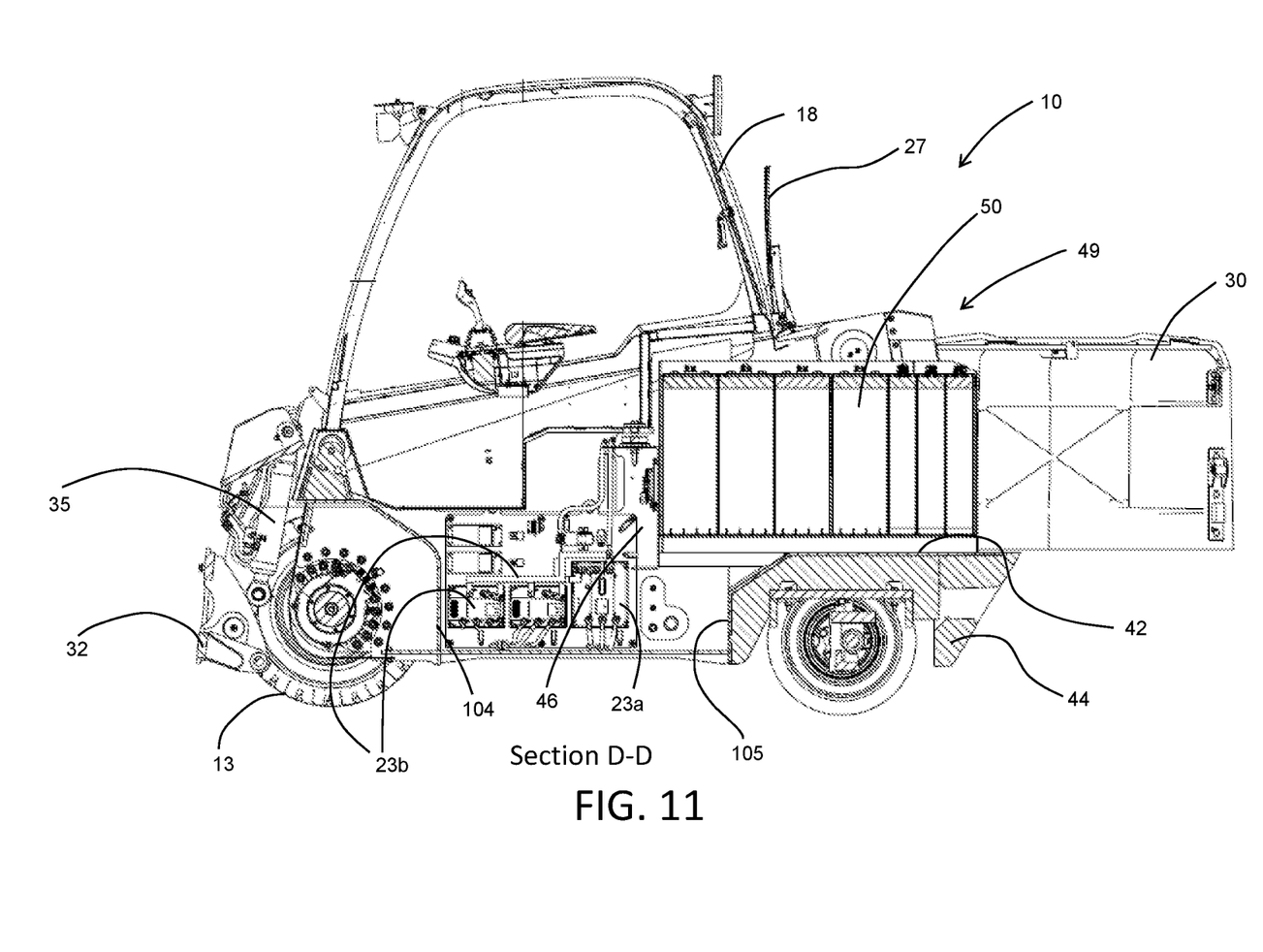
FIG. 11 is a cross-sectional view of the vehicle on the plane D-D of FIG. 7.

Referring now to FIGS. 10 to 12 the vehicle has a chassis 100 made as a welded fabrication of plate metal forming the structure of the vehicle that is required to transmit and react the offset load from the boom 25. This structure differs significantly from conventional mast type forklifts where the majority of the load is transmitted directly from the mast to the front wheels.

The chassis 100 comprises a pair of generally planar side frame members 101, 102 disposed on one side of the vehicle and a box section side frame member 103 disposed on the opposite side of the vehicle. The frame members 101, 102 and 103 are connected together by transversely extending front and rear portions 104, 105 of the chassis which are of faceted configuration and essentially provide wheel arches for the front and rear wheels 13, 16 of the vehicle. The side frame members 101, 102 have, at their end, an upwardly extending part 101a, 102a respectively provided with an aperture 101b, for the pivot point 26. The frame members may be manufactured from steel plate that is around 15 mm thick.

The front transverse member 104 is provided with a pair of upstanding brackets 109 for pivotably mounting the operator compartment 18 via the pivot 38.

In addition, the chassis at the front end, is provided with a pair of forwardly projecting parts 106 to mount the electric drive motors 22a, 22b.

In the present example the ratio of the width of the operator's compartment to the overall width of the vehicle is 0.67:1 and the above mentioned ratio may lie, if desired, in the range 0.5:1 to 0.8:1.

In the present example the vehicle has an overall width of 1270 mm. If desired, the width may be other than that specifically described with reference to the example and is generally less than 1.3 m.

The boom 25 is disposed so that when the boom is in a lowered position, as illustrated, an operator may see laterally as well as forwardly and rearwardly over the top of the boom and the load carrying implement. Even when the boom is being raised or lowered the operator view is relatively unobstructed as the operator's vision is only obstructed when the implement and any load carrier thereon is in his line of sight. This is in contrast with a conventional fork lift truck in that the operator's view forwardly is not obstructed by any permanently present mast.

With reference in particular to FIGS. 4 to 12, the incorporation of a battery pack 50 into the load-handling vehicle 10 is described in more detail.

In this embodiment the battery pack comprises a plurality of individual cells 52 which are generally cuboid in shape. The cells 52 in this embodiment are lead acid cells and each cell has a voltage of 2 volts and capacity of 1.2 kWh. The battery pack 50 comprises in this embodiment 40 such cells 52 which thereby provides a total battery capacity of 50 kWh and 625 Ah. For a vehicle of the type described above undertaking a standard duty cycle, and with a suitable safety margin provided, it is considered that the capacity is sufficient to power the vehicle 10 for an 8 hour shift.

In this embodiment, lead acid batteries are utilized as they are widely accepted in the forklift truck industry. Further, due to their density, are additionally useful to counter balance the load to be carried by the vehicle 10 if suitably positioned thereon. However, in other embodiments alternative battery technology may be used, such as lithium ion, or the batteries may be partially or wholly replaced in the battery pack by other electrical storage media such as super capacitors.

Figure 1:
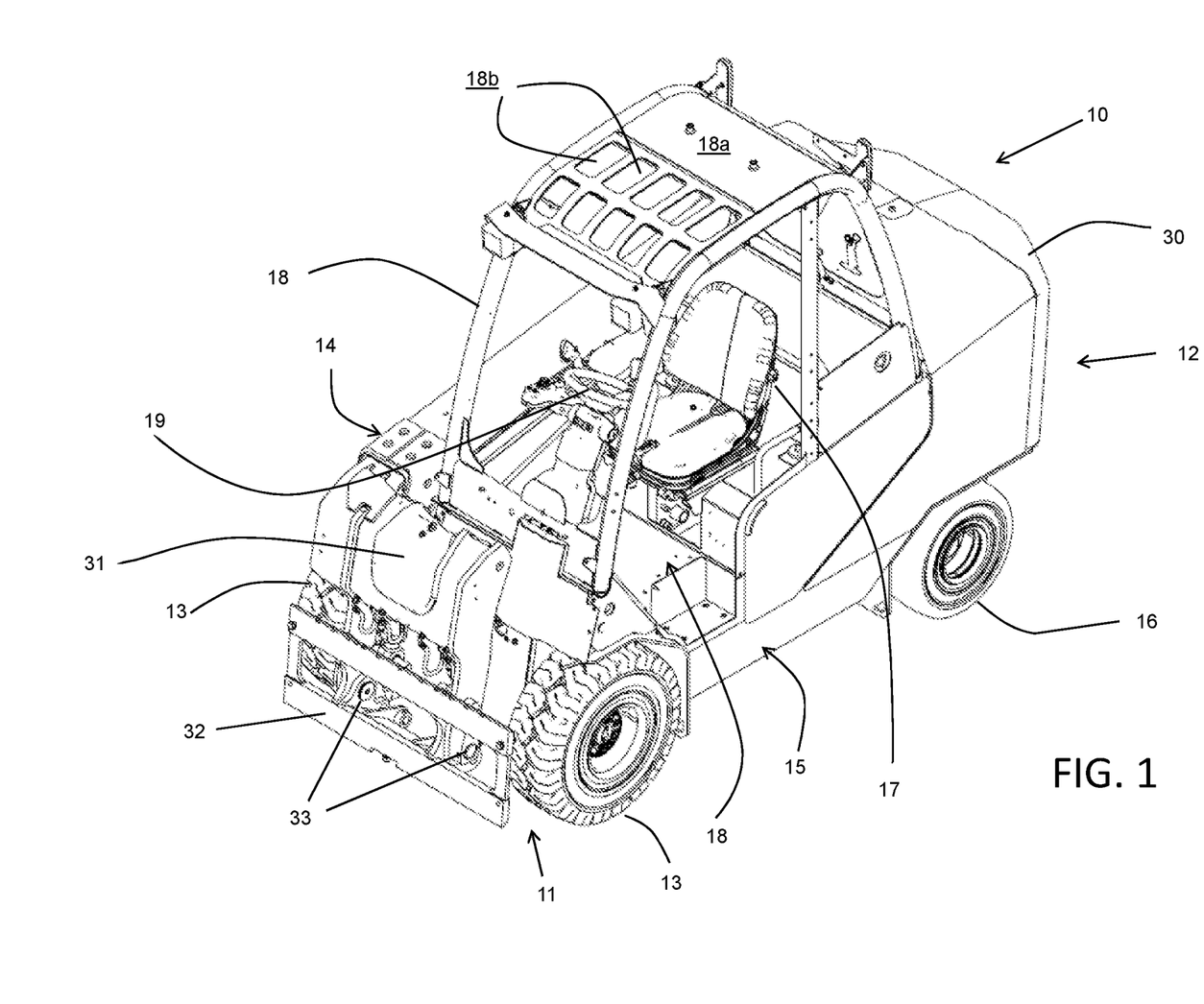
FIG. 1 is an isometric view of a load handling vehicle.
Figure 2:
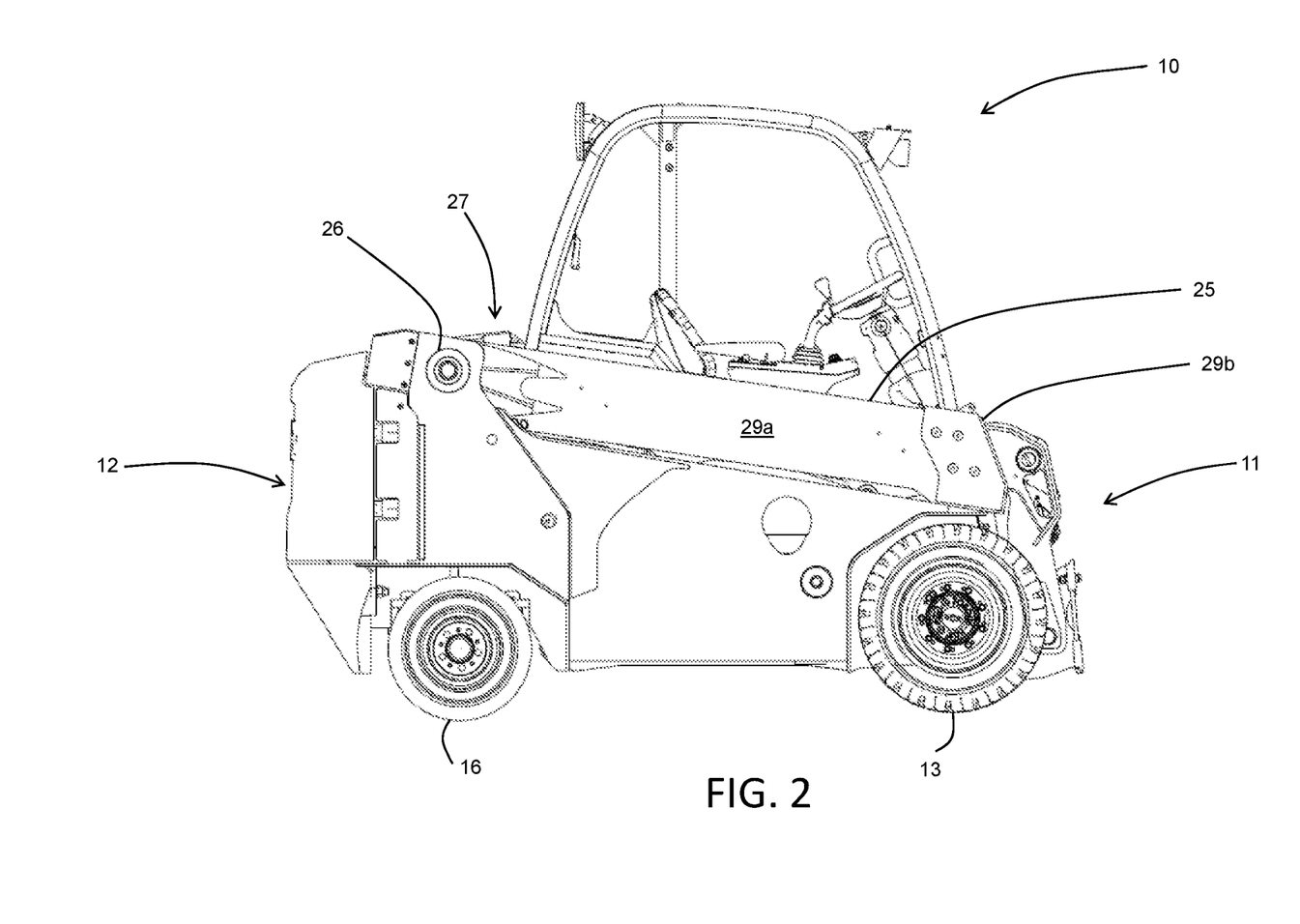
FIG. 2 is a side view of the vehicle of FIG. 1.
Figure 3:
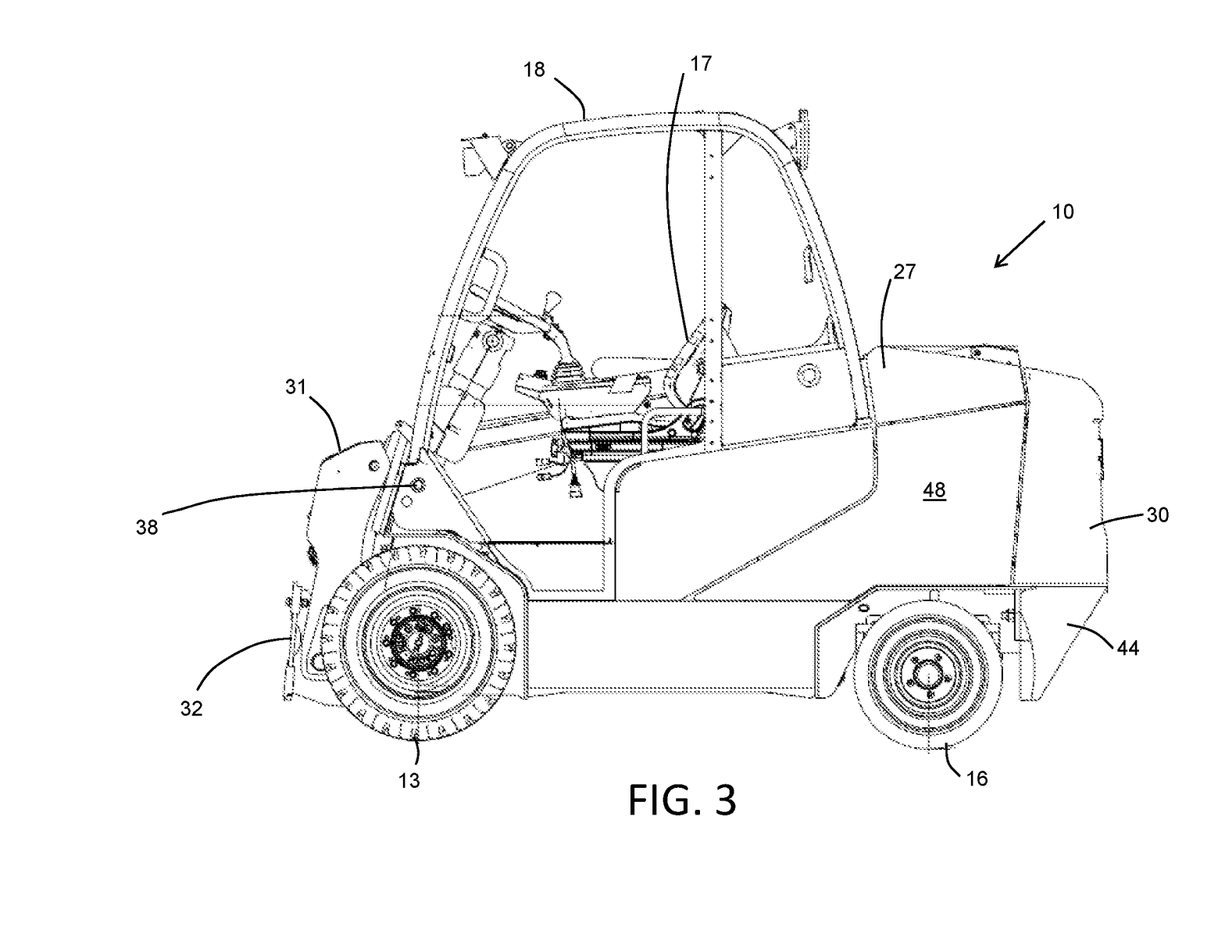
FIG. 3 is an opposite side view of the vehicle of FIG. 1.
Figure 4:
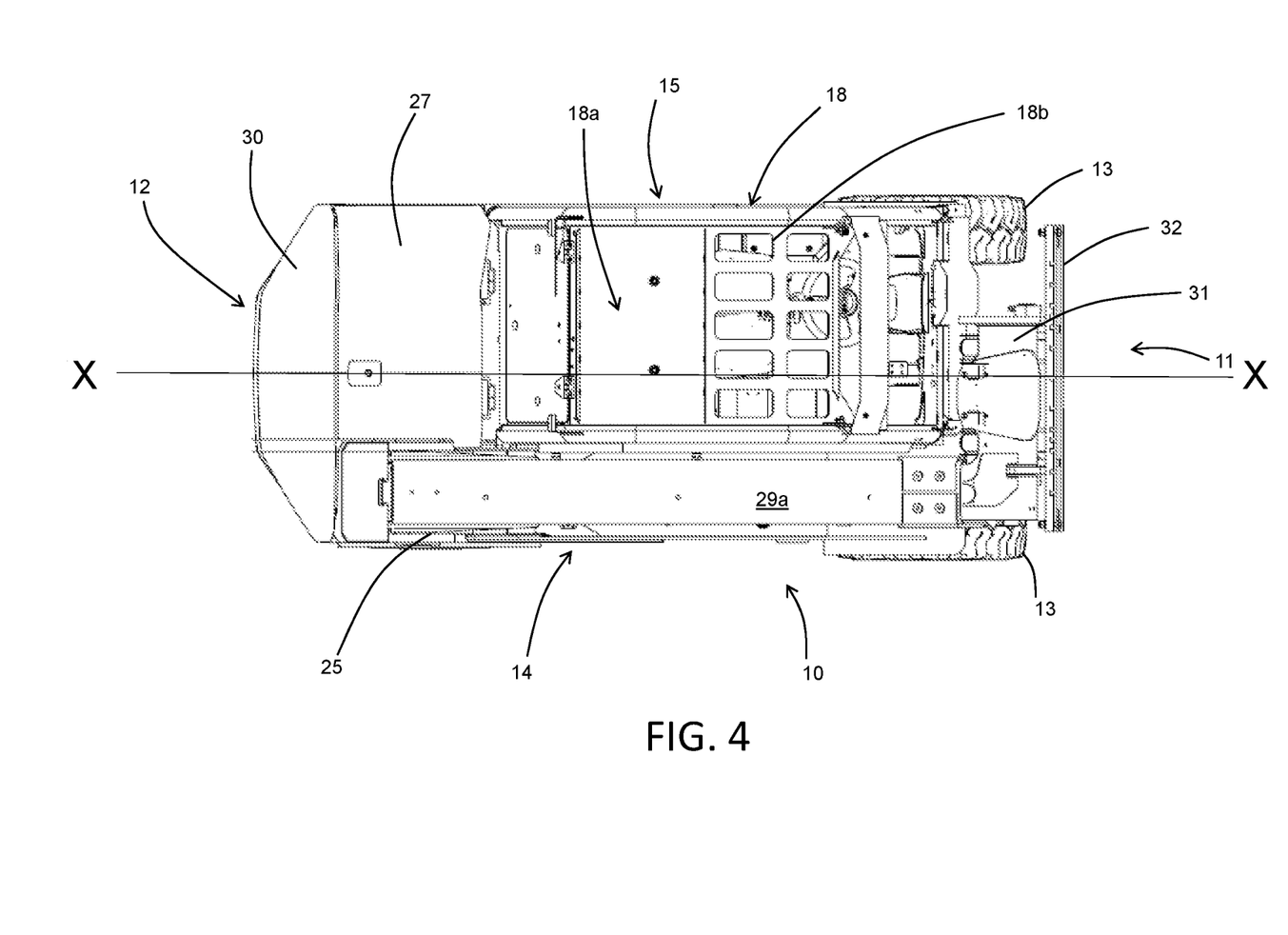
FIG. 4 is a plan view of the vehicle of FIG. 1.
Figures 5, 5A:
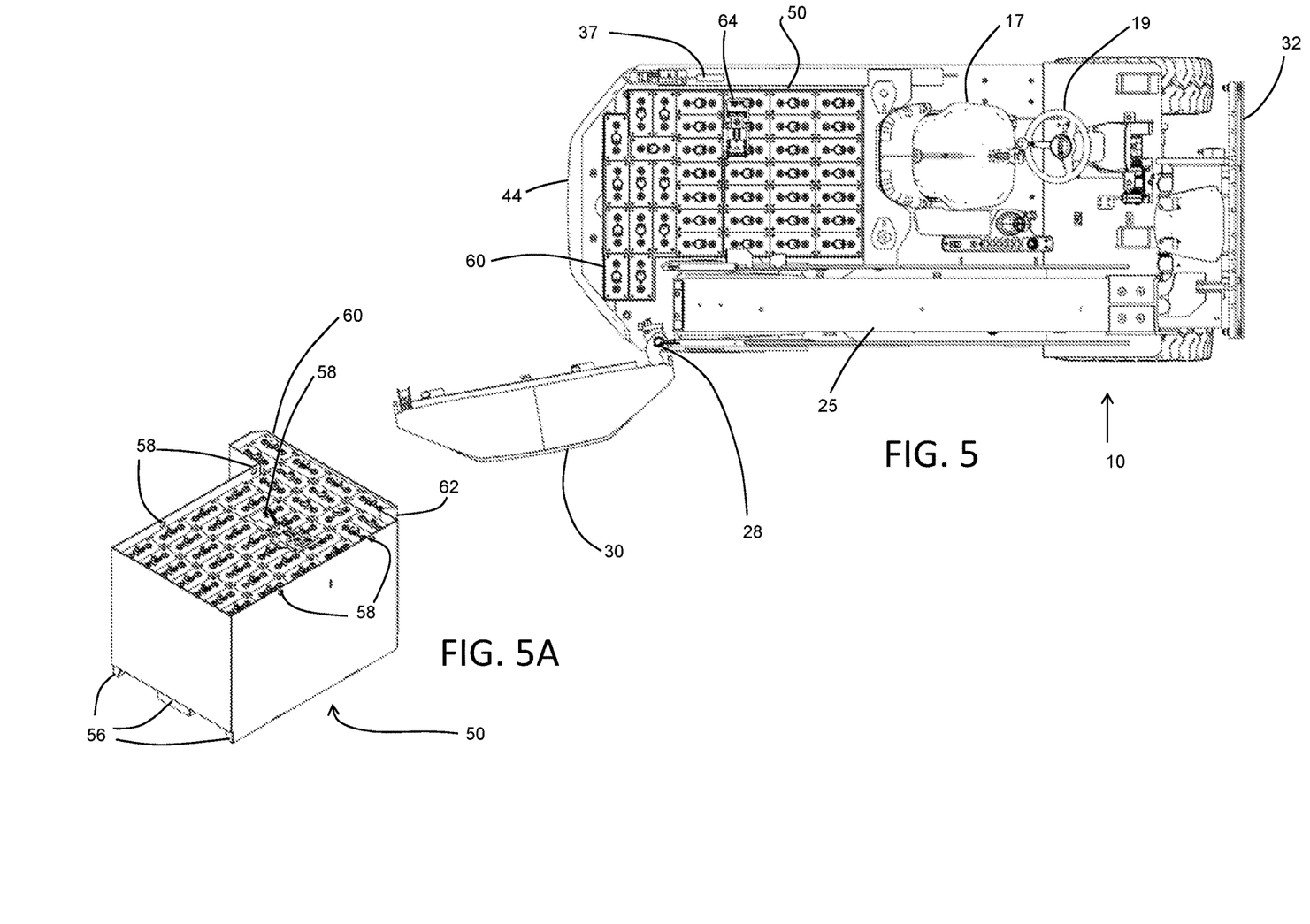
FIG. 5 is a plan view of the vehicle of FIG. 1 with certain components removed.
FIG. 5A is an isometric view of a battery pack to be mounted within the vehicle of FIG. 1.

As can be seen most clearly in FIG. 5A, the battery pack 50 comprises a container 54 having a base and vertical walls fabricated, for example, from sheet steel in which the cells 52 are housed. The underside of the container 54 is provided with three elongate support legs 56 which between them define two channels that enable a standard fork attachment of a load handling vehicle to be inserted under the container 54 and for the battery pack 50 to therefore be lifted and moved by a load-handling vehicle 10 of the present teachings, or indeed by a conventional forklift truck or other working machine.

Further, the container 54 is provided proximate the upper edge of two opposing side walls with lifting eyes 58 per side. The eyes 58 are located in such a position as to permit an arrangement of ropes or chains to be attached thereto and to lift the battery pack 50 at its centre of gravity. Further, or alternatively, a lifting eye 58 is provided in the battery pack 50 at or around the actual centre of gravity of the battery pack so that it may be lifted by a single chain or rope that is clear of a bonnet when lifted (discussed in further detail below) of the vehicle 10. This lifting eye may be formed in a divider sheet arranged to separate adjacent rows of cells 52 within the container. It will be appreciated that the container 54 provides the structural strength to enable the battery pack 50 to be lifted, as well as also providing a measure of protection for the cells 52 within it from external impacts, e.g., during handling.

As can be seen in FIGS. 5 and 5A in particular, contrary to known battery packs, the battery pack 50 of the present teachings is of a non-regular shape. That is to say that despite being filled with individual cells that are of a uniform cuboid shape, the battery pack 50 is not itself square or rectangular in plan view, i.e., it is non-symmetrical about either a front-to-rear axis or side-to-side axis. Specifically, in this embodiment the battery pack 50 has a dog leg configuration in which two cells 52 define a protrusion 60 from one side of what would otherwise be a generally rectangular shape of pack. Further, on the opposite side to the protrusion 60, one corner of the pack 62 is recessed as indicated at 62. As is visible in FIGS. 5 and 5A, this irregular shape is achieved by packing the cells 52 within the container 54 without any substantial voids or wasted space being present therein. As can also be seen in FIG. 5A, the container 54 is chamfered in the region of the protrusion 60 and recess 62 such that the wall of the container interconnecting these two features is lower than the other three walls. For illustrative purposes, in this embodiment, the battery pack has an overall width (including protrusion 60) of 912 mm, a length of 1124 mm, and height of 667 mm.

Figure 7:
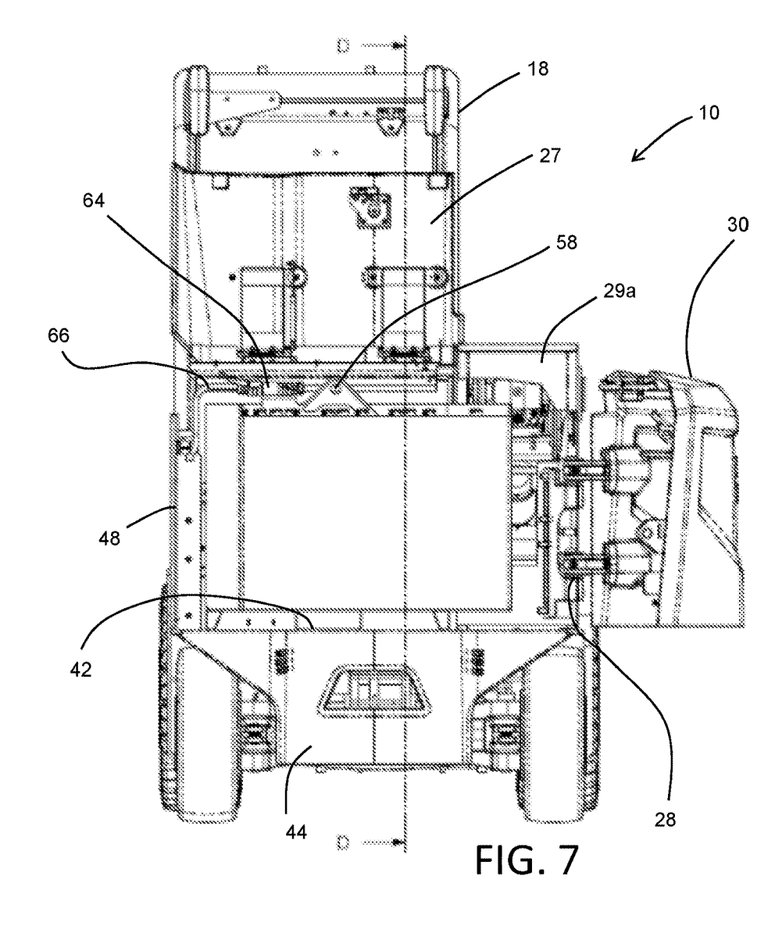
FIG. 7 is a rear view of the vehicle of FIG. 1 with a battery access door and bonnet opened.
Figure 9:
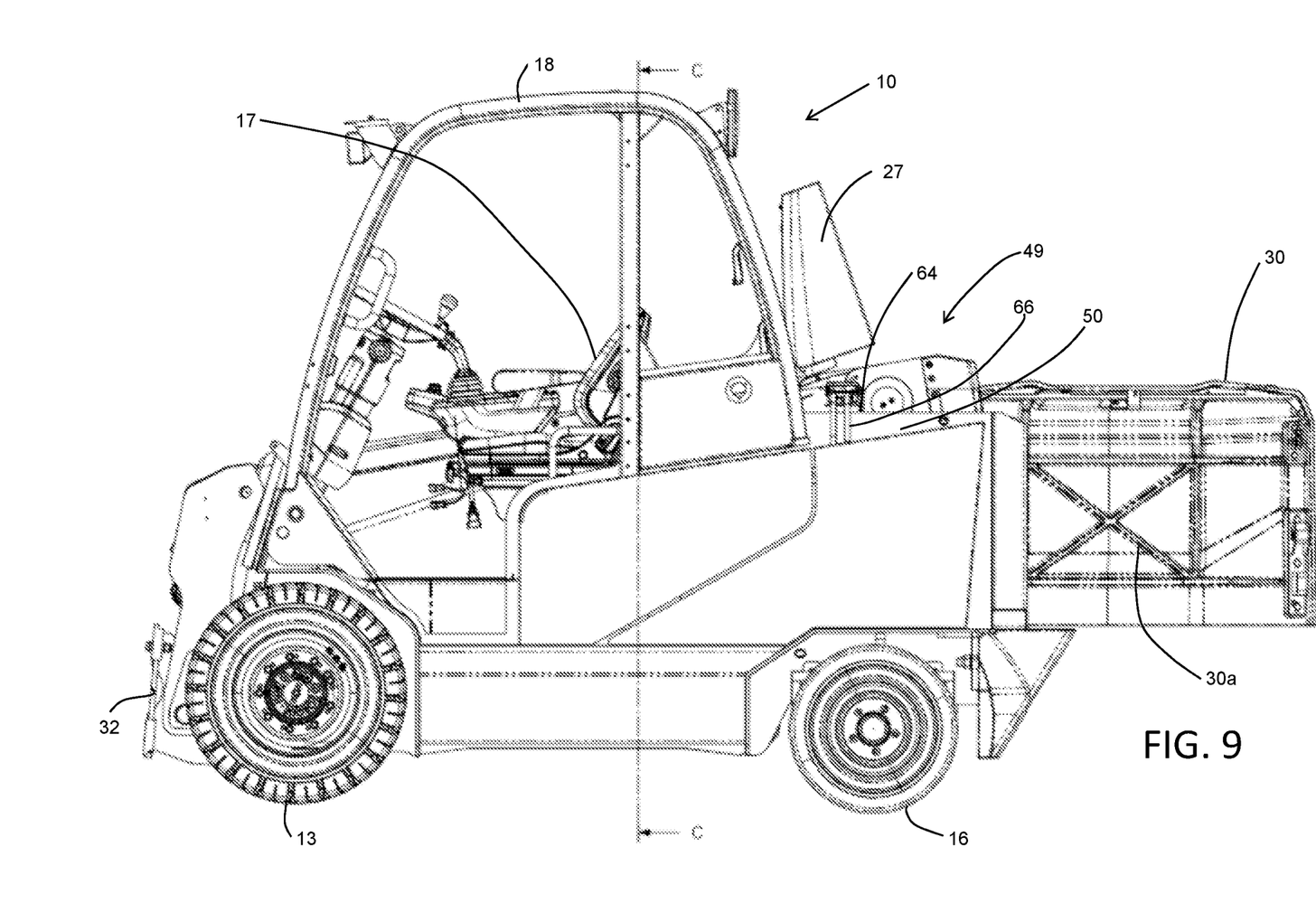
FIG. 9 is a side view similar to FIG. 3 but with the bonnet lifted and battery access door opened.

Finally, the battery pack 50 is also provided with a connector 64 on the top thereof to couple the battery pack to an electrical supply 66 of the vehicle 10 as can be seen in FIGS. 7 and 9 for example (or to a charger to recharge the battery pack—not shown).

Figure 8:
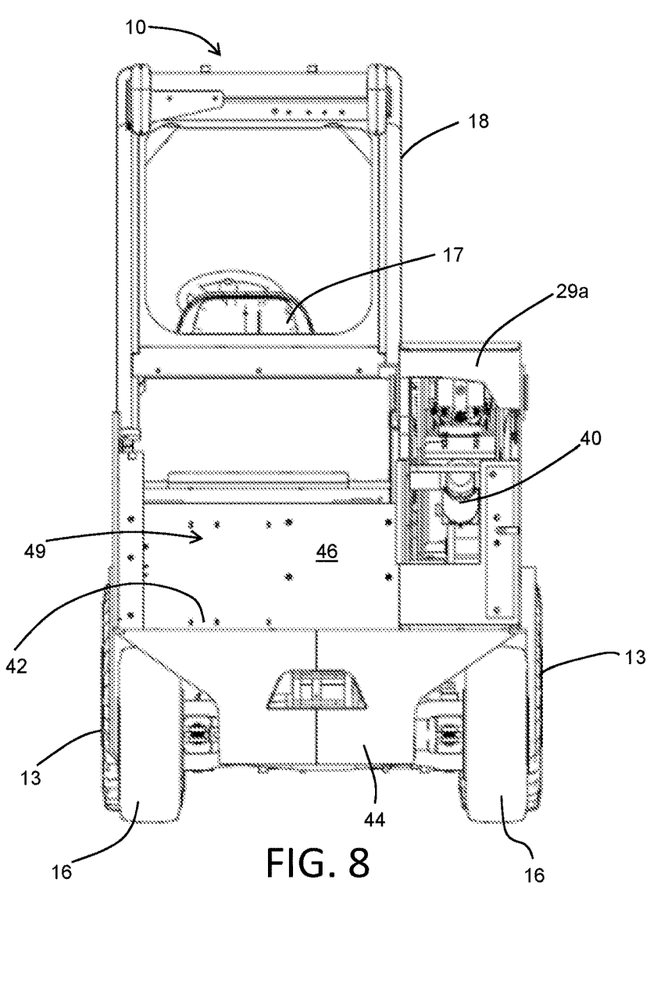
FIG. 8 is a rear view similar to FIG. 3 but additionally with the battery pack of FIG. 5a removed.

As can be seen in FIGS. 7, 8 and 11 a platform 42 is provided generally towards the rear of the vehicle 10 to receive the battery pack 50. For reasons of stability and rearward operator visibility, it is desirable for the platform 42 to be as low as possible. As such the height of the platform is defined by the uppermost surface of the transverse rear frame member 105 (which is itself limited by the height of the wheels and steering mechanism), as well as the uppermost surface of a counter weight 44 mounted rearwardly of the rear wheels 16. In this embodiment, the height of the platform is 573 mm, but in other embodiments may be in a range of 0.65 m to 0.500 m. In this embodiment the rear overhang (distance from rotational axis of rear wheels 16 to rear of vehicle) is 634 mm but may be in a range of 0.2 m to 0.8 m.

Forward of the transverse rear frame member, an additional support plate is provided so that a horizontal surface is provided along the entirety of the battery pack and this terminates in a bulkhead 46 that acts as a forward stop for the battery pack 50, as well as being a mounting location for the operator's compartment 18. To guide and support the battery pack 50 laterally, at the boom side thereof, the second planar side frame member 102 may act as a guide and on the opposing side, a further upright support 48 is also provided, that acts as a guide, as well as supporting the bodywork of the vehicle.

At the rear, a battery access door 30 pivotable about a vertical axis is provided and finally, a bonnet or hood 27 mounted to pivot about a front horizontal axis above the battery pack. As such, the platform 42, bulkhead 46, second planar side frame member 102, upright support 48, access door 30 and bonnet 27 define an enclosed battery compartment 49 of the vehicle 10.

With reference to the battery access door 30, it is important to recognize that this represents an important safety feature of the vehicle 10. Specifically, the rear wheel steer arrangement of the vehicle and the fact that it operates in confined spaces, means that the rear 12 of the machine is particularly susceptible to accidental collisions and impacts with foreign bodies. As leakage of acid from lead acid batteries by virtue of them being punctured by such an impact would result in a significant safety risk, it is therefore important that the battery access door 30 is not merely cosmetic in nature and in fact has sufficient strength to withstand accidental impact that may occur in use and prevent the intrusion of foreign bodies into the battery pack 50. Therefore, the battery access door is manufactured of heavy gauge steel (e.g. greater than 10 mm thick) or a casting of e.g. spheroidal graphite iron, is pivotably mounted to the first planar side frame member 101 (FIG. 12) via a hinge 28 and is further reinforced with reinforcing members or ribs 30a as can be seen in FIG. 9. Further, the forming of the door into three mutually angled vertical faces adds to the inherent structural integrity whilst reducing the degree to which the rear of the vehicle swings outwards during cornering maneuvers thereby reducing the risk of impact in the first place. It will be noted that the provision of the recess 62 in the battery pack 50 is to allow the battery pack to fit within the angled shape.

Due to the battery access door 30 being strong, it additionally has a significant mass (of the order of 200 kg or more) and therefore provides an additional counterweight. It is therefore important that before the vehicle is operated, the door is securely closed, firstly so that it cannot swing freely and hit foreign objects, and secondly so that it can be assured that it is in place to protect the battery pack 50. To this end, the vehicle 10 is fitted with a sensor that acts as an interlock in the electrical control system such that it is not possible for the machine to be operated until it has sensed that the battery access door 30 is properly closed and latched. For example a non-contact vane or Hall Effect sensor (not visible) may be mounted on the hinge 28 to act as the interlock. Additionally, the release mechanism 37 for the latch is recessed within the upright support 48 and only accessible once the bonnet 27 is lifted thereby preventing inadvertent opening of the battery access door 30 and protecting the latch from damage. In other embodiments the sensor may be connected to an audible and/or visual warning signal rather that or in addition to an interlock Referring now to FIGS. 10 to 13 the space 19 under the operator compartment can be seen in more detail. This space 19 conveniently houses electronic control systems indicated generally at 23, the hydraulic pump 21 for hydraulic systems such as the various hydraulic rams 35 and 40 and its associated motor 20. The space is well protected, but nevertheless easily accessible by tilting the operator compartment 18 forward.

The control systems include a controller 23a for the hydraulic pump motor 20, and individual controllers 23b for the drive motors 22a, 22b, as well as associated cabling.

It can be seen that the controllers 23a and 23b are mounted to the second planar side frame member 102 via a plate. The plate is a heat sink plate 68, manufactured from a heat conductive material such as aluminum. A box section region 107 is defined between the first and second side frame members 101, 102, which is sealed to act as a reservoir of hydraulic fluid.

The control electronics generate a significant amount of heat in operation, and the particular mounting arrangement utilizes the chassis 100 as an effective heat sink. The plate 68 assists in the transmission of heat away from the electronics and into the chassis. This arrangement contrasts with known systems on conventional electric mast type forklift trucks that typically require forced air cooling for the control electronics that may add to complexity, cost and parasitic losses of electrical power.

Figure 6:
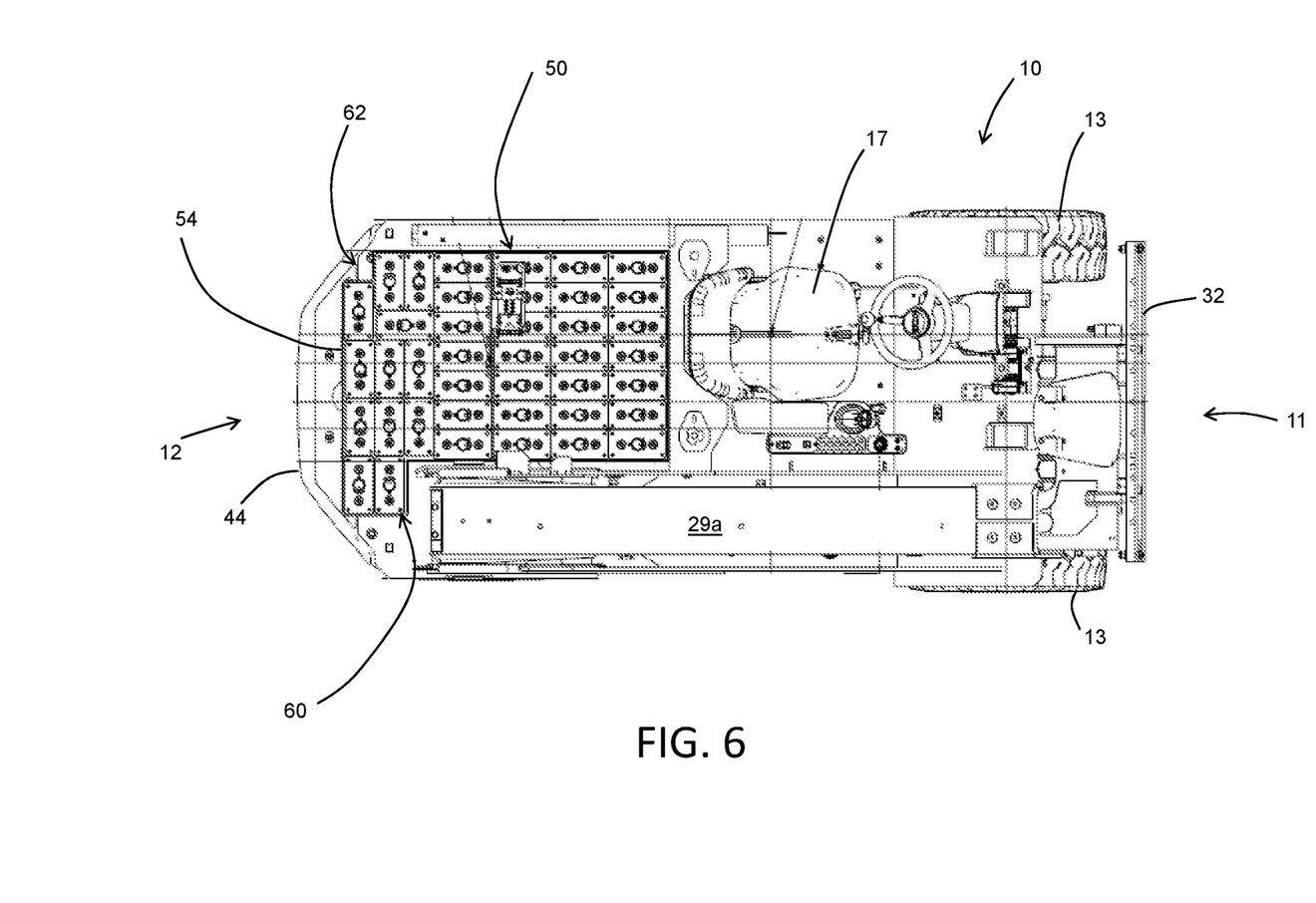
FIG. 6 is a further plan view similar to FIG. 4 but with a battery access door closed.

FIGS. 5, 6 and 7 show the battery pack 50 in situ on the platform 42. From FIGS. 5 and 6 in particular it can be seen that the protrusion 60 of the battery pack extends rearwardly of the boom over approximately half the width thereof in a lateral or sideways direction. As such, the protrusion 60 maximizes the utilization of available space within the vehicle 10 whilst continuing to use cells of a standard size. Furthermore, by having a battery pack 50 of an irregular shape it becomes impossible to fit the pack onto the platform 42 in an incorrect orientation because it simply would not fit. As such, this ensures that the connector 64 to the electrical supply 66 is correctly positioned for connection. In other words, the shape of the battery pack functions as a foolproofing or "poka yoke" feature.

By utilizing the maximum available area of the vehicle 10 to receive the battery pack 50, the height of the battery pack can be minimized. Therefore the combination of this with the relatively low height of the platform means that the top of the bonnet is also low, in this embodiment 1423 mm, but is typically in the range of 1.5 to 1 m. This means that an operator has good rear visibility to lessen the risk of unwanted collisions with foreign objects. The chamfer at the rear of the container 54 further enables the bonnet to slope downwardly in a rearward direction, further improving the rear visibility. The enables the vehicle 10 to comply with the IS013564-1 ("Powered industrial trucks—Test methods for verification of visibility—Part 1: Sit-on and stand-on operator trucks and variable-reach trucks up to and including 10 t capacity") standard for visibility without the need for additional aids such as mirrors or cameras.

In order to remove the battery pack 50 for charging, firstly the bonnet 27 is lifted and the electrical supply 66 disconnected from connector 64. From the same position the operator can then actuate the release mechanism 37 for the battery access door 30 and open the door. In locations where a second load-handling vehicle is available, this will then be used to insert forks underneath the battery pack 50, lift it and reverse it out of the battery compartment 49 otherwise a crane or lifting device with chains or rope connected to the lifting eyes 58 may be used. The battery pack can then be charged away from the vehicle 10. A second fully charged battery pack can then be loaded onto the platform 42 by the second load-handling vehicle, the electrical supply 66 connected to connector 64, the rear door 30 closed and latched and the bonnet lowered and latched for further operation of the vehicle. As noted previously the interlock on the battery access door 30 prevents operation of the vehicle 10 until it is sensed that the rear door is latched.

It will be appreciated that numerous changes may be made within the scope of the present teachings. For example, whilst various dimensions and proportions of the vehicle have been discussed above, these may be adjusted as required depending on the particular application, e.g., if a lower powered more compact version of the machine is desired the dimensions may be reduced, as a larger version of the machine may be longer and/or wider. The battery access door may be curved rather than faceted, or may have more or fewer than three faces. It may be pivotally mounted about a horizontal axis and/or may be combined with the bonnet into a single moveable battery access door.

Further, although not currently preferred, it may nevertheless be possible for the loading and removal of the battery to occur in a sideways direction towards and away from the boom 29. In this case, the battery access door at 30 at the rear may be replaced by a solid immovable structure and a separate battery access door be located at the side in place of the upright support 48.

The invention claimed is:
1. A load-handling vehicle, comprising:
a body;
a boom, pivotally mounted to the body at a rear end region so that the boom can pivot up and down about an axis extending laterally with respect to the vehicle, wherein the boom has a load carrying implement attachable at a forward end region thereof;
a steerable ground engageable propulsion arrangement;
an electrically powered drive for the propulsion arrangement;
a platform positioned at the rear of the body and to a side of the boom;
a battery pack positioned on the platform, wherein the battery pack comprises a lateral projection configured to locate rearwardly of the boom.
2. The load-handling vehicle of claim 1 wherein the battery pack has a non-regular shape in plan view.
3. A load-handling vehicle, comprising:
a body;
a boom, pivotally mounted to the body at a rear end region so that the boom can pivot up and down about an axis extending laterally with respect to the vehicle, wherein the boom has a load carrying implement attachable at a forward end region thereof;
a steerable ground engageable propulsion arrangement;
an electrically powered drive for the propulsion arrangement;
a platform positioned at the rear of the body and to a side of the boom; and
a battery pack positioned on the platform;
wherein the battery pack has a non-regular shape in plan view; and
wherein the battery pack comprises a recess in plan view at a rear corner thereof on an opposite side of the vehicle to the boom.
4. The load-handling vehicle of claim 2 wherein the battery pack comprises a plurality of standard sized cells arranged to achieve the non-regular shape.
5. The load-handling vehicle of claim 1 wherein the battery pack comprises a container arranged so as to support and protect cells of the battery.

6. The load-handling vehicle of claim 1 wherein the platform is configured to permit the removal of the battery pack in a rearward direction and loading in a forward direction.

7. The load-handling vehicle of claim 6 wherein a battery access door is located rearward of the battery pack and is operable so as to permit access thereto.

8. The load-handling vehicle of claim 7 wherein the vehicle further comprises a sensor associated with the battery access door contained to sense if the door is open or closed.

9. The load-handling vehicle of claim 7 wherein the battery access door is hingedly mounted to a structural part of the body of the vehicle.

10. The load-handling vehicle of claim 9 wherein the battery access door is mounted to a chassis portion of the body that pivotably mounts the boom.

11. The load-handling vehicle of claim 1 wherein the ground engagable propulsion arrangement comprises a pair of wheels arranged towards the front of the vehicle and a pair of wheels arranged towards the rear of the vehicle.

12. The load-handling vehicle of claim 1 wherein the vehicle further comprises an operator compartment arranged generally forward of the battery pack.

13. The load-handling vehicle of claim 12 wherein a portion of the operator compartment is arranged above the battery pack.

14. The load-handling vehicle of claim 11 wherein the vehicle further comprises a space provided within a volume defined between the front and rear wheels and offset to the side of the boom, said space arranged to accommodate functional components of the vehicle.

15. The load-handling vehicle of claim 14 wherein the vehicle comprises a control system and the control system is located in the space.

16. The load-handling vehicle of claim 15 wherein the vehicle further comprises a structural member of the body and the control system is mounted to the structural member.

17. The load-handling vehicle of claim 1 further comprising an electric motor drivingly connected to a hydraulic pump arranged to supply hydraulic fluid to actuate movement of the boom.

18. The load-handling vehicle of claim 14 further comprising an electric motor drivingly connected to a hydraulic pump arranged to supply hydraulic fluid to actuate movement of the boom, wherein the electric motor and hydraulic pump are located within the space.

19. The load handling vehicle of claim 1, wherein the platform is immediately adjacent to the side of the boom.

20. The load handling vehicle of claim 1, wherein the boom can pivot about the laterally extending axis only.

21. The load-handling vehicle of claim 10, wherein the pair of wheels arranged towards the rear of the vehicle are steerable.

* * * * *